United States Patent [19]
Salter

[11] 3,860,208
[45] Jan. 14, 1975

[54] CONSTANT TENSION PIPE SUPPORTS

[75] Inventor: Anthony John Salter, Worcestershire, England

[73] Assignee: Pipe Supports Limited, Tividale, Warley, England

[22] Filed: Feb. 8, 1973

[21] Appl. No.: 330,633

Related U.S. Application Data

[63] Continuation-in-part of Ser. No. 217,463, Jan. 13, 1972, abandoned.

[30] Foreign Application Priority Data
Mar. 16, 1972 Great Britain ............... 12215/72
Mar. 17, 1972 Great Britain ............... 12785/72
May 18, 1972 Great Britain ............... 23401/72

[52] U.S. Cl. .................... 248/54 CS, 248/58
[51] Int. Cl. ........................................ F16l 3/00
[58] Field of Search ............ 248/54 CS, 58, 59, 324; 138/107

[56] References Cited
UNITED STATES PATENTS

| | | | |
|---|---|---|---|
| 1,937,135 | 11/1933 | Wood | 248/54 CS |
| 2,709,057 | 5/1955 | Gould | 248/54 CS |
| 2,939,663 | 6/1960 | Suozzo | 248/54 CS |
| 2,965,341 | 12/1960 | Sherburne | 248/54 CS |
| 3,217,118 | 11/1965 | Suozzo | 248/54 CS X |
| 3,534,934 | 10/1970 | McCabe | 248/54 CS |
| 3,650,498 | 3/1972 | Deak | 248/54 CS X |
| 3,718,305 | 2/1973 | Suozzo | 248/54 CS |

FOREIGN PATENTS OR APPLICATIONS

| | | | |
|---|---|---|---|
| 1,242,140 | 8/1971 | Great Britain | 248/54 CS |
| 1,240,670 | 7/1971 | Great Britain | 248/54 CS |
| 902,222 | 8/1962 | Great Britain | 248/59 |

*Primary Examiner*—Roy D. Frazier
*Assistant Examiner*—Rodney H. Bonck
*Attorney, Agent, or Firm*—Merriam, Marshall, Shapiro & Klose

[57] ABSTRACT

The specification discloses a constant-tension pipe support in which adjustment of the spring lever arm is effected by movement of a shaft by screw means, the shaft being guided by complementary guide means on the shaft and the support lever, the guide means having engaging, planar guide surfaces on both the lever and the shaft, the surfaces engaging in pairs of oppositely directed surfaces.

3 Claims, 6 Drawing Figures

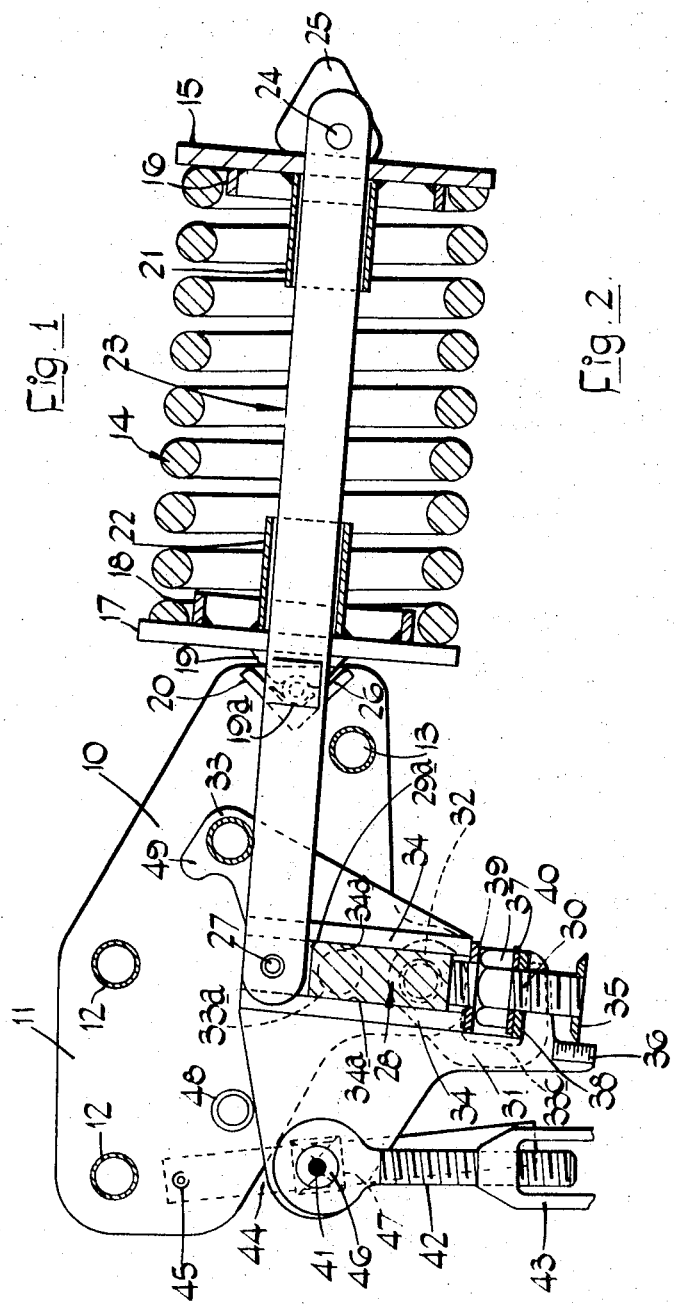
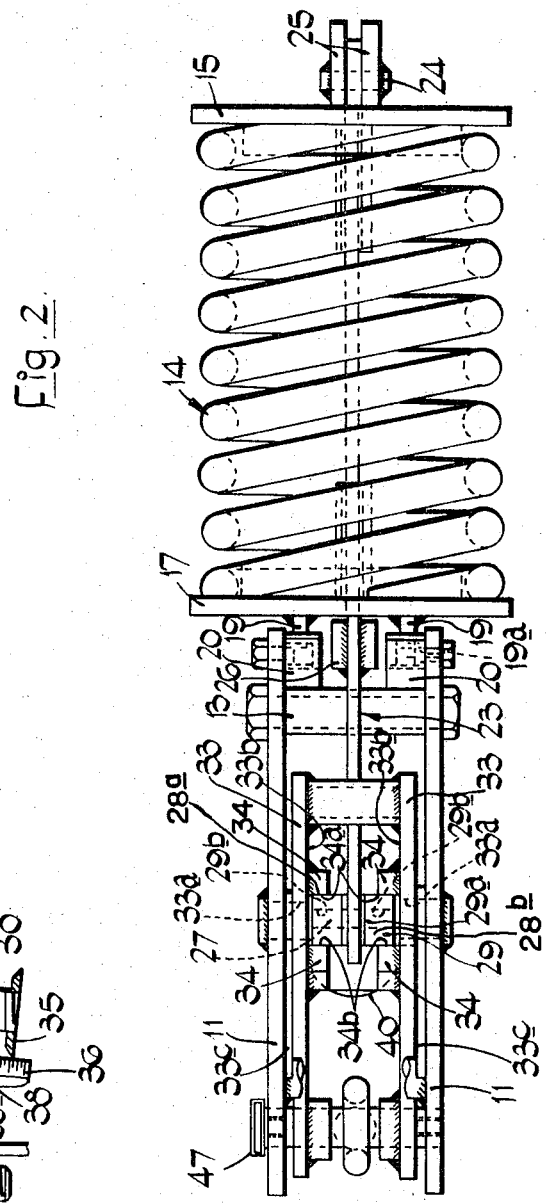
Fig. 1
Fig. 2

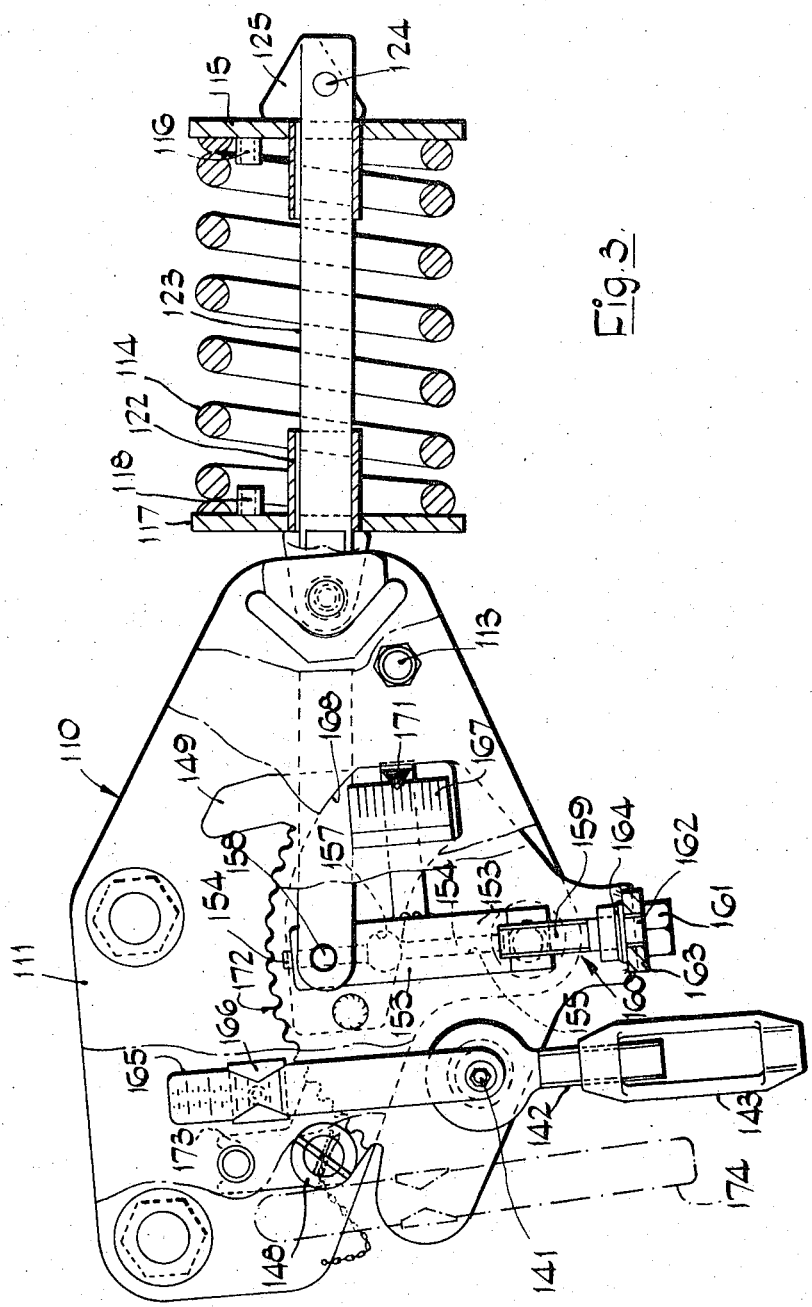

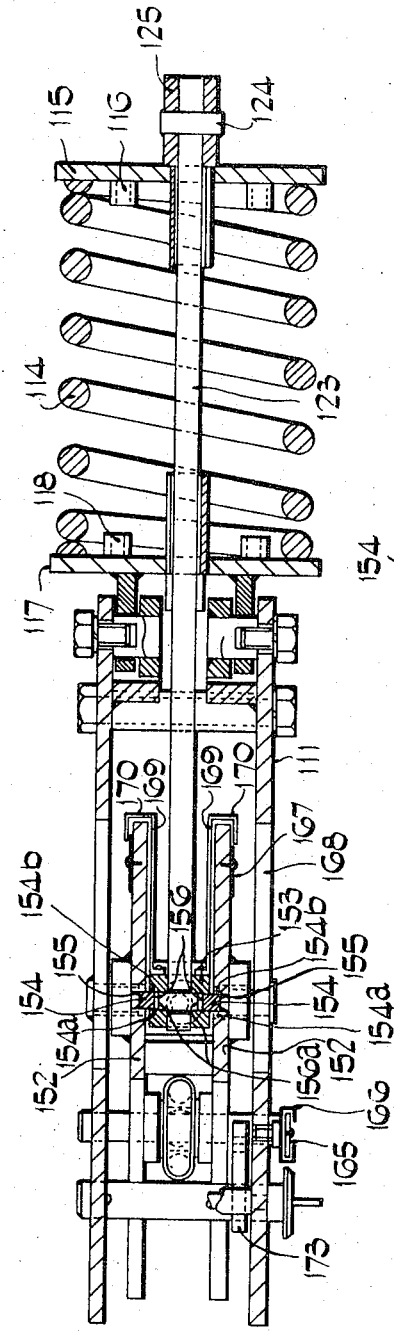

CONSTANT TENSION PIPE SUPPORTS

REFERENCE TO RELATED APPLICATIONS

This is a continuation in part of my Application Ser. No. 217,463 filed Jan. 13, 1972 and now abandoned.

BACKGROUND OF THE INVENTION

1. Field of the Invention

This invention relates to a constant-tension pipe supports which are used for supporting pipes which are subject to thermal expansion, for example, steam pipes in generating stations, the pipes being supported by a substantially constant force while being allowed to move as a result of changes in the temperature thereof and resulting expansion and contraction of the pipes.

2. Description of the Prior Art

Such supports normally include a pivoted lever, one arm of which is connected to spring means and the other arm of which is connected to the load, e.g. a pipe, to be supported. It is usual to provide means on the lever whereby the movement of the spring force can be changed by adjusting the length of the lever arm of the spring force, i.e. the spring lever arm, about the pivot.

Often the lever comprises spaced lever plates and a common form of spring lever arm adjustment is to form aligned slots in the plates in which are engaged pins which project from opposite ends of a block connected to the spring draw bar and movable towards and way from the pivot axis of the lever. These known arrangements suffer the pivot axis of the lever. These known arrangements suffer from the disadvantage that there are high point loads between the pins and the slot so that adjustment in service is difficult and wear takes place which makes adjustment even more difficult.

The arrangement shown in British Patent No. 1,240,670 overcomes the problem by providing a shaft which slides in a cylindrical bore in a block secured between the lever plates. Unfortunately there are manufacturing difficulties encountered in using this arrangement with the larger size of support since the bore may have to be of the order of 4 inches in diameter and is thus difficult to produce.

Another arrangement is shown in British Patent No. 1,242,140 in which a clevis block connected to the spring draw bar slides between the lever plates and is guided by two aligned guide blocks welded to the inner surface of the side plates. The spring force pulls the clevis block against the guide blocks. The disadvantage of this construction is that, if the load should suddenly be reduced, the resulting pivotal movement of the lever may be faster than that of the spring and thus the clevis block resulting in damage to the support and bending of the clevis block or draw bar which could put the support out of action. Such a sudden movement of a supported pipe can take place if, for example, a valve in the pipe circuit is suddenly closed.

SUMMARY OF THE INVENTION

It is an object of the present invention to provide a constant-tension pipe support having simple means permitting the effective lever arm of the spring means to be varied and which avoids the manufacturing and operational problems outlined above.

According to the present invention there is provided a constant-tension pipe support including a fixed part; a lever comprising twp spaced lever plates mounted on said fixed part for movement about a pivot axis, the lever having connector means for the load to be supported; spring means carried by the fixed part; a draw-bar interconnecting the spring means with the lever; and adjustment means carried by the lever for varying the effective lever arm of the spring means about the pivot axis, said adjustment means including an elongated shaft, a pivotal connection between the shaft and the draw-bar, complementary guide means on the shaft and the lever, the guide means on each of the shaft and the lever having two, oppositely-directed planar guide surfaces which lie parallel to the longitudinal axis of the shaft and parallel to said pivot axis, each guide surface on the shaft being in engagement with a guide surface on the lever to form a pair of engaged guide surfaces, the guide surfaces of each such pair being oppositely directed thus to prevent movement of the shaft transverse to its longitudinal axis, the guide surfaces on the shaft extending along the major part of the length of the shaft, and screw means, including an adjustment element, operatively connected with the shaft for effecting longitudinal movement of the latter in response to operation of the adjustment element thus to vary the spacing between the pivot axis and the pivotal connection between the shaft and the draw bar and hence to vary the lever arm of the spring means.

BRIEF DESCRIPTION OF THE DRAWINGS

The invention will now be described in detail by way of example with reference to the accompanying drawings in which:

FIG. 1 is a sectional side view of one form of constant-tension pipe support embodying the invention;

FIG. 2 is a plan view of the pipe support shown in FIG. 1;

FIG. 3 is a sectional side view of another form of constant-tension pipe support embodying the invention;

FIG. 4 is a plan view of the support of FIG. 3;

FIG. 5 is a detail plan view on a larger scale of the shaft and the guide blocks therefor of the support of FIGS. 3 and 4, and FIG. 6 is a view similar to FIG. 5 showing an alternative arrangement.

DESCRIPTION OF THE PREFERRED EMBODIMENT

The support shown in FIGS. 1 and 2 comprises a fixed part indicated generally at 10 and comprising two side plates 11 which are interconnected adjacent their tops by spacer tubes 12 which provide means whereby the fixed part 10 can be suspended from a fixed structure. The side plates 11 are also connected by a lower spacer tube 13. For convenience the spacer tubes 12 have not been shown in FIG. 2.

The support includes spring means comprising a helical compression spring 14 which engages at one end a first spring retaining plate 15 which carries a centering collar 16 for the spring 14. At its other end the spring 14 engages a second spring retaining plate 17 having a centering collar 18. The spring retaining plate 17 carries triangular lugs 19 which are located between the flanges of rolled-steel, angle-section elements 20. The apices of the flanges 19 are rounded or provided with a cylindrical bearing element 19a and each has a curvature corresponding to that of a curvate bearing surface between the flanges of the associated element 20 whereby the spring retaining plate 17 is arranged to pivot about an axis at right angles to the plane of FIG.

1. Said axis is hereinafter referred to as the spring pivot axis.

A guide tube 21 is secured to retaining plate 15 and a second guide tube 22 is secured to the plate 17 and the two guide tubes 21 and 22 project within the turns of the spring 14 and a draw bar 23 is a sliding fit in said guide tubes 21 and 22 and passes through the plates 15 and 17. The draw bar 23 has the configuration shown in the drawings and, adjacent one of its ends, it is formed with a bore in which a pin 24 is located. The pin 24 passes through aligned bores in a pair of cam plates 25 and is welded to said cam plates. The pair of cam plates provide a cam assembly arranged to bear against washers (not shown) located in engagement with the outer surface of the first spring retaining plate 15. The aligned bores in the cam plates are located at different spacings from the three sides of each generally triangular cam plate. The spacing of the pin 24 from the outer face of the retaining plate 15 thus depends on which side of the cam assembly is in engagement with said outer face. The spacing between the retaining plates 15 and 17 and thus the initial loading of the spring 14 can thus be varied by operation of said cam assembly.

The spring 14 is arranged so that it urges the two retaining plates 15 and 17 away from each other and thus acts to urge the draw bar 23 to the right as viewed in the drawings. The draw bar 23 has a two-part retainer block 26 welded to it at a position intermediate its ends and the block 26 is arranged so that it engages the left hand face of the plate 17 (for convenience the block 26 has been shown in FIGS. 1 and 2 spaced from said face of the plate 17). The block 26 engaging the plate 17 limits the degree of movement of the draw bar 23 to the right as viewed in the drawings.

The draw bar 23 is arranged to pivot with the retainer plate 17 about the spring pivot axis relative to the fixed part 10. The spring draw bar 23 is connected, at its end remote from the pin 24, by a pin 27 to a shaft 28 in the form of a rectangular block and carrying at its lower end a threaded pin 30. The shaft is formed adjacent its upper end with a slot 29a to receive the end portion of the draw bar 23 and with aligned transverse bores 29b in which the pin 27 is received. The shaft 28 is arranged for sliding movement in the direction of its axis in guide means fixed to a lever indicated generally at 31. This lever is pivoted to a lever indicated generally at 31. This lever is pivoted to the fixed part 10 of the support for movement relative thereto about an axis 32 formed by a pivot pin and which is hereinafter referred to as the lever pivot axis. The lever 31 comprises two spaced lever plates 33 which are secured together and are parallel to, and received between, the side plates 11 of the fixed part 10 of the support. Welded to the outerfaces of the lever plates 33 are reinforcing plates 33c each of which, together with its lever plate, provides a bore of sufficient length to receive a bearing for the pivot pin 32. The lever plates 33 are provided with apertures 33a through one or the other of which the pin 27 is introduced into the aligned bores in the shaft 28. The apertures 33a are out of register with the normal path of movement of the pin 27 but the pin may be inserted into position during assembly of the support.

The guide means for the shaft 28 comprises four guide blocks 34 welded to the internal surfaces of the lever plates 33. The blocks provide two pairs of oppositely facing planar surfaces 34a and 34b. The shaft 28 has oppositely directed planar guide surfaces 28a and 28b which engage the surfaces 34a and 34b respectively and the shaft is also guided by the internal surfaces 33b of the plates 33. It will be noted that the surfaces 34a, 34b and 28a and 28b extend parallel to the longitudinal axis of the shaft and engage in pairs to prevent movement of the shaft transverse to its axis.

The lower end of the pin 30 is provided with an indicator disc 35 which is arranged to co-operate with a scale 36, fixed to one of the lever plates 33, to indicate the axial position of the shaft 28. The pin 30 receives a nut 37 which constitutes an adjustment element and which is located between a plate 39 which bears against the lower ends of the guide blocks 34 and is secured to the lever plates 33, and a washer 40 which rests on a plate 38 also secured to the lever plates. When the nut 37 is rotated by means of a suitable hand tool, since it is located against movement in the direction of the axis of the shaft 28, the shaft 28 is caused to move axially, the shaft being prevented from pertaking of said rotary movement by virtue of its connection to the draw bar 23.

The lever pivot axis 32 about which the lever 31 pivots relative to the fixed part 10 intersects the axis of the shaft 28 at right angles as does the axis of the pin 27 and the arrangement is that, on effecting axial movement of the shaft 28 relative to its guide means, the spacing between the lever pivot axis 32 and the axis of pivotal connection of the draw bar 23 to the shaft 28 is adjusted, the degree of adjustment being indicated by co-operation of the disc 35 with the scale 36.

The lever 31 can be considered as a two armed lever, one arm extending between the lever pivot axis 32 and the axis about which the draw bar 23 is pivotally connected to the shaft 28, said arm being of variable length, and the other arm extending between the lever pivot axis 32 and an axis 41 about which an eye bolt 42 is pivotally connected to the lever 31, the eye bolt 42 carrying a turn-buckle 43 by which the pipe or load to be supported is connected to the lever 31. An indicator scale 44 is pivoted at 45 to one of the side plates 11 of the fixed part 10 and there is a direct reading sliding indicator pointer 47 which is located about the pin 46 which connects the eye bolt 42 to the lever 31 so that, during pivotal movement of the lever 31 about the pivot 32, the indicator pointer slides relative to the scale 44 to indicate the degree of movement of the lever about the pivot.

The eye bolt 42 has a generally cylindrical opening in which the pin 46 is received. The pin 46 is of less diameter than said opening.

In the position shown in FIG. 1 the lever 31 is at the limit of its clockwise movement, i.e. the load to be supported is at its uppermost position. In this position a tube 48 extending between the side plates 11 of the fixed part 10 engages the upper surface of the lever 31. The tube 48 also serves to limit the extent of anti-clockwise pivotal movement of the lever 31, being engaged by a hook formation 49 of each lever plate 33 as the limit of the anti-clockwise pivotal movement of the lever 31.

Referring now to FIGS. 3 and 4, these show a constant-tension pipe support which is similar in many respects to that described in detail in relation to FIGS. 1 and 2, the main difference so far as the present invention is concerned being in the guiding of the shaft for varying the length of the spring lever arm. Parts in FIGS. 3 and 4 which are identical or similar to those in FIGS. 1 and 2 have been designated with the reference numerals used in FIGS. 1 and 2 with the prefix 1. It is considered unnecessary to describe the common parts again in detail.

The fixed part of the support 110 comprises the side plates 111 and pivoted between the side plate is a lever 151 comprising spaced lever plates 152. A shaft 153 which is of generally rectangular cross-section is received between the plates 152. The shaft is guided for longitudinal movement by blocks 154. These blocks are received in slots 155 in the lever plate 152 and are welded in the slots. The blocks project inwardly of the plates 152 and each block 154 presents oppositely directed planar surfaces 154a and 154b. The shaft is provided with two recesses parallel to its longitudinal axis, the recesses being indicated at 156. These recesses present oppositely directed planar guide surfaces 156a and 156b. The planar guide surfaces 154a and 156a are in engagement and the planar guide surfaces 154b and 156b are in engagement. The engagement of these planar guide surfaces guides the shaft 153 for movement parallel to its longitudinal axis.

As will be clear from FIG. 3, there are two guide blocks 154 in each slot 155 and between the adjacent ends of the guide blocks there is an aperture 157 whereby a pivot pin 158 can be inserted into aligned bores in the shaft 153 and the draw bar 123 during assembly of the support. The apertures 157 are normally out of alignment with the path of the pivot pin 158 during operation of the support.

The shaft 153 is provided at its lower part with a threaded bore in which is engaged the threaded shank 159 of a bolt 160 having a head 161. The bolt has a plain portion 162 which passes through a clearance hole in a reaction member 163 which is welded to the lower edges of the lever plates 152. A thrust collar and washer assembly 164 is welded to the bolt above the reaction member 163. Rotation of the head 161, which constitutes an adjustment element, causes longitudinal movement of the shaft 153 due to the threaded engagement between the shank 159 and the bore in the shaft and because the shaft is prevented from rotating by the guide blocks and recesses.

The position of the load can be read off on a scale 165 pivoted to the lever 151 about the load pivot axis 141 and being engaged by a pointer 166 pivoted to one of the sides plates 111.

Means is provided for indicating the length of the spring lever arm. This means comprises two scales 167 secured to the outer surfaces of the lever plates 152 and visible through apertures 168 in the side plates 111. The scales cooperate with two indicating elements 169 which are secured to the shaft 153 and have retroverted portions 170 which extend around the right hand edges of the lever plates 152 and terminate in pointers 171 which cooperate with the scales 167. It will be seen that as the shaft 153 is moved longitudinally pointers 171 will move across the scales 157 thus indicating in effect the position of the pivot pin 158 and the effective length of the spring lever arm. The apertures 168 are such that the scales 167 can be read over the whole operative range of the support.

Instead of having the blocks 154 welded to the lever plates and received slidably in the shaft, the blocks may be welded in recesses in the shaft and slide in slots or recesses in the lever plates as shown in FIG. 6. This figure corresponds to FIG. 5 and corresponding parts have the same reference numbers as in FIG. 5 except with the prefix 2 instead of the prefix 1. Thus a lever plate is indicated at 252 and part of a shaft 253. The shaft has a recess 256 in which is welded a block 254. The block has oppositely disposed guide surfaces 254a and 254b and these slidably engage the guides surfaces 255a and 255b in a slot 255 in the lever plate 252. It will be appreciated that a similar arrangement would be provided on the other side of the shaft and in the other lever plate. The operation of the embodiment of FIG. 6 is identical to that described in relation to FIGS. 3 to 5 except that the blocks are fixed to the shaft and slide in the lever plates instead of vice versa.

Means for locking the lever in any desired position comprises peripheral teeth 172 on one of the lever plates and a locking dog 173 which is slidable into and out of engagement with the teeth. This locking arrangement forms the subject matter of a copending application Ser. No. 316,817 filed on Dec. 20, 1972.

An alternative position for the load indicator is indicated in dotted line at 174.

Both of the constructions which have been described in detail avoid the manufacturing and operational difficulties referred to above. Thus in each case guide means for the shaft is easy to manufacture. In FIGS. 1 and 2 it is only necessary to weld blocks to the internal surfaces of the lever side plates. In the embodiment of FIGS. 3 to 5, it is necessary to form slots in the lever side plates and recesses in the shaft. However, the arrangement shown in FIG. 3 to 5 has the advantage that the shear forces on the weld holding the blocks to the lever side plates is eliminated. Due to the configuration and engagement of the guide surfaces on the shaft and the lever, the shaft is fully guided for longitudinal movement and cannot be bent if there is a sudden release of the load as described above.

It will be seen, therefore, that the invention provides in a simple manner an excellent guide for the adjustment of the spring lever arm in a constant tension pipe support which overcomes the operational and manufacturing difficulties which have been encountered heretofore.

The invention is also applicable to a pipe support in which the spring means is arranged to act in a vertical direction, the draw bar being arranged substantially vertically and the shaft extending generally horizontally.

I claim:

1. A constant-tension pipe support including a fixed part; a lever comprising two spaced lever plates mounted on said fixed part for movement about a pivot axis, the lever having connector means for the load to be supported; spring means carried by the fixed part; a draw bar interconnecting the spring means with the lever; and adjustment means carried by the lever for varying the effective lever arm of the spring means about the pivot axis, said adjustment means including an elongated shaft, a pivotal connection between the shaft and the draw bar, complementary guide means on the shaft and the lever and comprising blocks received in aligned slots or recesses both in the shaft and in the lever plates, the blocks being secured in the slots or recesses in one of the lever plates and the shaft and being slidable in the slots or recesses in the other of the lever plates and the shaft, each block and each recess or slot in said other of the lever plates and shaft having two oppositely-directed planar guide surfaces which lie parallel to the longitudinal axis of the shaft and parallel to said pivot axis, each guide surface on the block being in engagement with a guide surface in one of said recesses or slots in said other of the lever plates and shaft to form a pair of engaged, relatively slidable, guide surfaces, the guide surfaces of each such pair being oppositely directed thus to prevent movement of the shaft transverse to its longitudinal axis, and screw means, including an adjustment element, operatively connected with the shaft for effecting longitudinal movement of the latter in response to operation of the adjustment element thus to vary the spacing between the pivot axis and the pivotal connection between the shaft and the draw bar and hence to vary the lever arm of the spring means.

2. A constant-tension pipe support as claimed in claim 1 wherein the blocks are secured in slots in the lever plates and are slidably received in recesses in the shaft.

3. A constant-tension pipe support as claimed in claim 2 wherein the slots and recesses are aligned with the longitudinal axis of the shaft, there being two blocks spaced apart in each slot, the space between each two blocks permitting the insertion of a pivot pin to interconnect the draw bar and the shaft.

* * * * *

UNITED STATES PATENT OFFICE
CERTIFICATE OF CORRECTION

PATENT NO. : 3,860,208
DATED : January 14, 1975
INVENTOR(S) : Anthony John Salter It is certified that error appears in the above-identified patent and that said Letters Patent are hereby corrected as shown below:

Col. 1, line 28, delete "way" and insert --away--.
Col. 1, lines 30, 31, after "suffer" delete --the pivot axis of the lever. These known arrangements suffer--.
Col. 1, line 66, delete "twp" and insert --two--.

Col. 3, lines 46-47, after "a" delete --lever indicated generally at 31. This lever is pivoted to --.
Col. 4, line 19, delete "pertaking" and insert --partaking--.

Signed and sealed this 24th day of June 1975.

(SEAL)
Attest:

RUTH C. MASON
Attesting Officer

C. MARSHALL DANN
Commissioner of Patents
and Trademarks